United States Patent [19]
Flynn et al.

[11] 3,862,864
[45] Jan. 28, 1975

[54] PLASTICIZED NITROCELLULOSE PROPELLANT COMPOSITIONS CONTAINING HYDRAZINIUM NITROFORMATE AND ALUMINUM HYDRIDE

[75] Inventors: James P. Flynn; George A. Lane; John J. Plomer, all of Midland, Mich.

[73] Assignee: The Dow Chemical Company, Midland, Mich.

[22] Filed: June 16, 1965

[21] Appl. No.: 465,239

[52] U.S. Cl............... 149/19.8, 149/20, 149/36, 149/38
[51] Int. Cl............................................. C06d 5/06
[58] Field of Search.................. 149/18, 96–98, 149/38, 36

[56] References Cited
UNITED STATES PATENTS

| | | | |
|---|---|---|---|
| 3,002,830 | 10/1961 | Barr | 149/19 |
| 3,035,948 | 5/1962 | Fox | 149/19 |

*Primary Examiner*—Benjamin R. Padgett
*Attorney, Agent, or Firm*—C. Kenneth Bjork

[57] ABSTRACT

The invention is a solid double-base propellant composition comprising on a weight basis from about 5 to about 35 percent of a crystalline substantially non-solvated aluminum hydride, from about 20 to about 38 percent hydrazinium nitroformate and from about 30 to about 60 percent of a plasticized nitrocellulose binder.

3 Claims, No Drawings

PLASTICIZED NITROCELLULOSE PROPELLANT COMPOSITIONS CONTAINING HYDRAZINIUM NITROFORMATE AND ALUMINUM HYDRIDE

This invention relates to propellants and more particularly is concerned with a novel solid double base propellant composition exhibiting a high specific impulse.

It is a principal object of the present invention to provide a novel high energy propellant composition exhibiting a high specific impulse.

It is another object of the present invention to provide a novel double base solid propellant composition that cures at room temperature to a rubbery elastomer without undesirable gas formation.

These and other objects and advantages readily will become apparent from the detailed description presented hereinafter.

The present invention comprises a solid doublebase propellant composition containing on a weight basis from about 5 to about 35 percent of a crystalline substantially non-solvated aluminum hydride, from about 20 to about 38 percent hydrazinium nitroformate and from about 30 to about 60 percent of a plasticized nitrocellulose binder.

Ordinarily the composition comprises on a weight basis from about 24 to about 33 percent of the aluminum hydride, from about 20 to about 38 percent hydrazinium nitroformate and from about 45 to about 55 percent of a plasticized nitrocellulose binder.

A preferred embodiment of the present novel double base propellant composition consists essentially of about 27 weight percent non-solvated particulate, crystalline aluminum hydride, about 23 weight percent of hydrazinium nitroformate and about 50 percent of a plasticized nitrocellulose binder, said binder consisting of about 25 parts by weight plastisol grade nitrocellulose and 75 parts by weight of a 20 weight percent diethyleneglycol dinitrate-80 weight percent trimethylolethane trinitrate mixture.

Crystalline forms of non-solvated aluminum hydride particularly suitable for use in the composition of the present invention are those disclosed in copending application Ser. No. 179,509, filed Mar. 8, 1962, and Ser. No. 234,277, filed Oct. 23, 1962.

Ordinarily the binder is a blend containing, on a weight basis, from about 1 to about 5 parts of a nitroplasticizer to 1 part of a plastisol grade nitrocellulose. Diethyleneglycol dinitrate, triethyleneglycol dinitrate, trimethylolethane trinitrate and mixtures thereof are particularly effective plasticizers.

For optimum physical stability of the present propellant grain, i.e., substantially complete elimination of gassing during formulation, curing and storage, moisture and acids should be maintained at a desirably low level in all mix ingredients. Further, all manipulative procedures during formulation, as well as the curing and storage of the final propellant grain should be carried out in an inert, substantially anhydrous atmosphere, e.g., nitrogen or argon.

The present propellant is prepared by mixing and blending the particulate aluminum hydride crystals, hydrazinium nitroformate and plasticized nitrocellulose binder into a substantially homogeneous mixture. The mixture is cast, extruded or otherwise formed and cured at a maximum temperature of about 50°C., ordinarily at about room temperature, i.e. 18 to 25°C. for a period of from about 16 to about 48 hours, ordinarily from about 16 to about 24 hours. The resulting propellant is a solid, elastomeric, substantially void-free grain. For long term storage of the cured grain, temperatures at a maximum of about 20°C., preferably about 0°C. are used because hydrazinium nitroformate tends to gas at moderatly elevated temperatures, i.e. 35°C. and higher.

The solid particulate aluminum hydride fuel and hydrazinium nitroformate oxidizer as employed in the present novel composition are used in a particle size range ordinarily employed for fuel-oxidizer components in solid double base propellants.

The present composition finds utility as a propellant for rockets and rocket driven missiles.

The following Examples will serve to further illustrate the present invention but are not meant to limit it thereto.

EXAMPLE 1 -

About 27 parts by weight particulate crystalline substantially non-solvated aluminum hydride, 23 parts by weight of hydrazinium nitroformate and 50 parts by weight of a plasticized nitrocellulose binder were blended together to provide a substantially homogeneous mixture. The binder consisted of about 25 parts by weight plasticized nitrocellulose and about 75 parts by weight of a mixture of about 20 weight percent diethyleneglycol dinitrate-80 weight percent trimethylolethane trinitrate.

The mixture was cast into a propellant grain and cured at room temperature, i.e., from about 18° to about 25°C. for 24 hours.

The resulting cured product was a substantially void-free, elastomeric grain having a density of about 1.521 grams per cubic centimeter.

Combustion studies carried out in closed bombs and small cylindrical internal burning rocket motors showed the cured grain burned smoothly.

Heat of explosion values were determined for eight samples of the resultant grain. These were found to be $1610^{\pm 6}$ calories per gram.

Specific impulse determinations were carried out in a ballistic bomb. These gave an observed Isp° of 277 sec. Theoretical Isp° for the composition is 293.3 sec. indicating an efficiency of 94.4 percent.

EXAMPLE 2 -

The combustion temperature and theoretical impulse values were calculated for a number of formulations of the present invention. The propellant formulation data and performance results from this study are presented in Table I which follows:

TABLE I

| Run No. | Propellant Composition | | | | Results | |
|---|---|---|---|---|---|---|
| | $NC^1$ | $TMETN^2$ | $AlH_3$ | $HNF^3$ | Comb. Temp. °K | Specific Impulse Isp (sec.) |
| | weight per cent | | | | | |
| 1 | 12.5 | 37.5 | 30 | 20 | 3296 | 287.8 |
| 2 | 12.5 | 37.5 | 27 | 23 | 3466 | 293.3 |
| 3 | 11.25 | 33.75 | 31 | 24 | 3325 | 289.9 |
| 4 | 12.5 | 37.5 | 24 | 26 | 3520 | 291.1 |
| 5 | 11.25 | 33.75 | 28 | 27 | 3496 | 294.6 |
| 6 | 11.25 | 33.75 | 25 | 30 | 3560 | 292.7 |
| 7 | 10 | 30 | 30 | 30 | 3485 | 294.7 |
| 8 | 8.75 | 26.25 | 33 | 32 | 3381 | 291.5 |
| 9 | 10 | 30 | 27 | 33 | 3582 | 295.1 |
| 10 | 8.75 | 26.25 | 30 | 35 | 3550 | 296.7 |
| 11 | 10 | 30 | 24 | 36 | 3609 | 292.9 |

TABLE I-Continued

| | Propellant Composition | | | | Results | |
|---|---|---|---|---|---|---|
| Run No. | NC[1] | TMETN[2] | AlH₃ | HNF[3] | Comb. Temp. °K | Specific Impulse Isp (sec.) |
| | weight per cent | | | | | |
| 12 | 8.75 | 26.25 | 27 | 38 | 3630 | 295.8 |

[1]nitrocellulose
[2]trimethylolethane trinitrate
[3]hydrazinium nitroformate

In a manner similar to that described for the preceding Examples, solid double base propellant grains having other binders as set forth hereinbefore can be fabricated.

Various modifications can be made in the present invention without departing from the spirit or scope thereof for it is understood that we limit ourselves only as defined in the appended claims.

We claim:

1. A solid double-base propellant composition comprising on a weight basis
   a. from about 5 to about 35 percent of a crystalline substantially non-solvated aluminum hydride,
   b. from about 20 to about 38 percent hydrazinium nitroformate, and
   c. from about 30 to about 60 percent of a plasticized nitrocellulose binder.

2. A solid double-base propellant composition comprising on a weight basis
   a. from about 24 to about 33 percent of a crystalline substantially non-solvated aluminum hydride,
   b. from about 20 to about 38 percent hydrazinium nitroformate, and
   c. from about 45 to about 55 percent of a plasticized nitrocellulose binder.

3. A solid double base propellant composition consisting essentially of on a weight basis
   a. about 27 percent of a crystalline, substantially non-solvated aluminum hydride,
   b. about 23 percent hydrazinium nitroformate, and
   c. about 50 percent of a plasticized nitrocellulose binder, said binder consisting of about 25 parts by weight plastisol grade nitrocellulose and 75 parts by weight of a mixture of 20 weight percent diethyleneglycol dinitrate-80 weight percent trimethylolethanetrinitrate.

* * * * *